W. LÜBKE.
MILKING DEVICE.
APPLICATION FILED APR. 25, 1913.
1,089,932.
Patented Mar. 10, 1914.
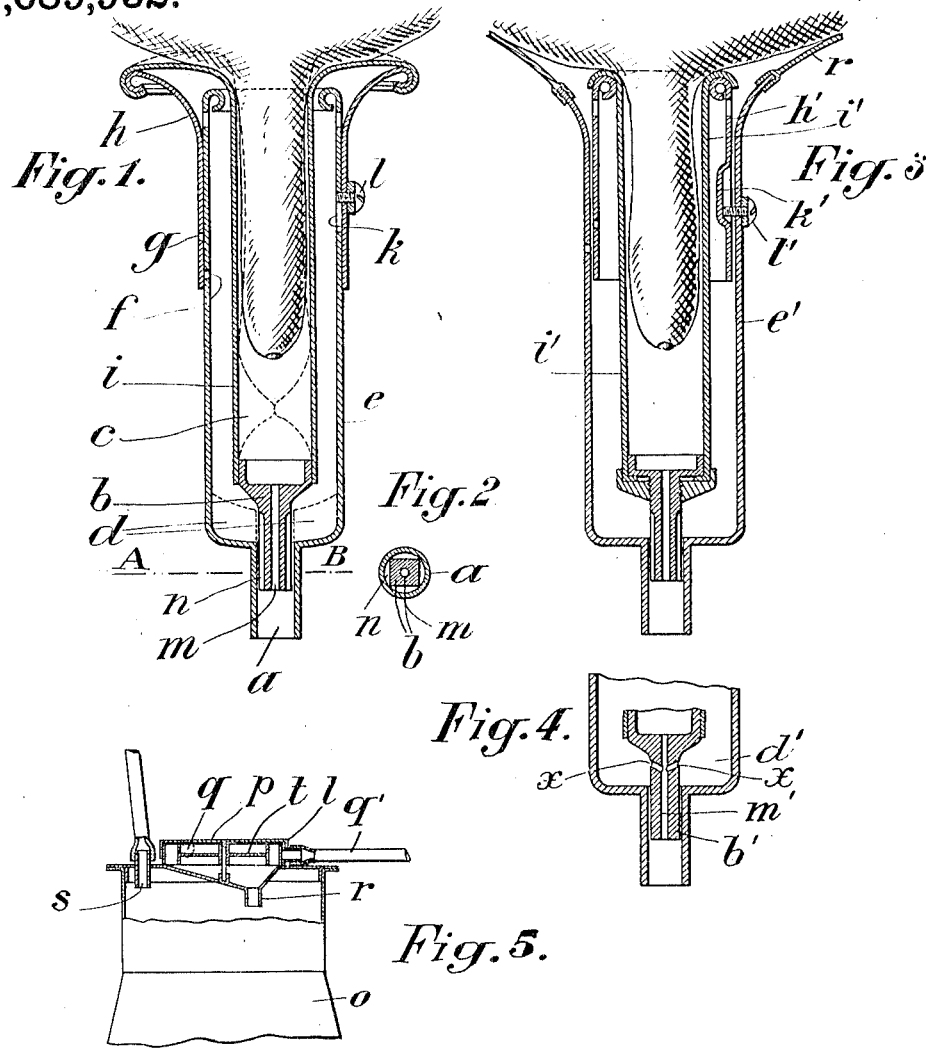
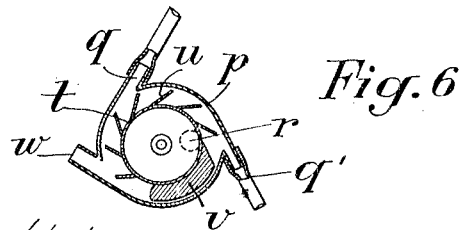
Witnesses:
Inventor:
Wilhelm Lübke
by Jno. Smirie Attorney.

UNITED STATES PATENT OFFICE.

WILHELM LÜBKE, OF BRESLAU, GERMANY.

MILKING DEVICE.

1,089,932.
Specification of Letters Patent.
Patented Mar. 10, 1914.

Application filed April 25, 1913. Serial No. 763,654.

*To all whom it may concern:*

Be it known that I, WILHELM LÜBKE, a subject of the German Emperor, and resident of Breslau, Germany, have invented certain new and useful Improvements in Milking Devices, of which the following is a specification.

The present invention relates to a milking apparatus in which each milking device comprises a central elastic tube which surrounds a teat, and a spaced sleeve which surrounds said central tube, the sleeve being moved in an upward direction during the suction operation. In the upward motion of the outer sleeve it strikes the udder and produces a kneading action on same, means being provided to admit air in the space between the sleeves to allow the outer sleeve to assume its normal shape.

The invention comprehends improvements in the construction and arrangement of parts to produce the necessary motion, whereby effective and efficient milking will follow.

In the accompanying drawing: Figure 1 is a vertical section of one of the milking devices, the suction device being removed; Fig. 2 is a horizontal section on line A—B of Fig. 1; Fig. 3 is a view similar to Fig. 1, but illustrating another form of the invention; Fig. 4 is a detail vertical section of the lower portion of a different form of the milking device; Fig. 5 is a vertical section of an air throttling device of the suction ducts; Fig. 6 is a top view of the same.

In the milking device shown in Fig. 1, $i$ is a central elastic tube which surrounds the teat. At the lower end of the tube $i$, is secured a nozzle $b$, provided with a small central duct $m$. A sleeve $e$, is concentrically disposed with respect to tube $i$, and it is formed at its lower end with a nozzle $a$, which surrounds the nozzle $b$. The nozzle $a$ is connected to a tube, leading to a suction device (not shown in the drawing), so that air from the space $c$, formed in tube $i$, as well as air from the annular space $d$, formed between the tubes $i$ and $e$, of the milking device may be withdrawn; that the air from the space $d$, may be withdrawn, the outer periphery of the nozzle $b$ being provided with longitudinal tapering grooves $n$. When the suction device is operated, the air in the space $d$, is drawn through the grooves $n$, and owing to the outside atmospheric pressure on the sleeve $e$, the latter is drawn up as indicated in dotted lines in Fig. 1. When the sleeve $e$, rises to its highest position, the nozzle $a$, closes the grooves $n$. At the upper end of the sleeve $e$, is a concentrically disposed funnel shaped cap $h$, formed with a vent opening $g$. The sleeve $e$, is formed with a vent opening $f$, and a slot $k$, and through the slot passes a screw $l$ by means of which the sleeve is held to the cap. The slot $k$, will permit the sleeve $e$, to rise in the cap, and the vent openings $f$ and $g$, will register and air will rush into the space $d$, and compress the elastic sleeve $i$, which will assume the position shown in dotted lines in Fig. 1. The suction device creates a vacuum in sleeve $i$, and when the air rushes in the space $d$, and collapses said tube $i$, it exerts a slight pressure on the teat, this pressure immediately follows the action of the sleeve $e$, gently striking the udder, and thereby completes the two movements necessary to draw the milk. These two movements closely follow each other, and last only momentarily for immediately the air rushes into space $d$, the sleeve $e$, drops again to its normal position. Then the suction action is again in communication with the space $d$, and the operation is repeated.

The vertical reciprocation of the sleeve $e$, is limited by the slot $k$, and screw $l$, and at the same time the slot $k$ prevents rotation of the sleeve and cap.

In Fig. 3, the cap $h'$ is located within the sleeve $e'$, the upper portion of which is provided with a rubber ring $r$, bearing against the udder. The cap $h'$ is provided with a groove $k'$, in which the screw $l'$ fits to guide the device during its vertical displacements. The elastic tube $i'$ is secured at the upper rounded end of sleeve $h'$.

Fig. 4 shows a constructive form of the lower portion of the milking device in which the nozzle $b'$ is provided with radial inclined ducts $w$, $w'$, opening within the central duct $m'$ instead of longitudinal grooves as shown at $n$, in Fig. 1.

For producing large vertical displacements of the milking sleeves and a corresponding kneading action on the udder, a pulsator is inserted in the ducts connecting the milking vessel with the suction device. Two or four of such connecting ducts may be provided, because it is convenient to alternately work the four portions of the udder, instead of working same simultaneously. It is consequently necessary to throttle more or less said connecting ducts during certain interlapses of time.

The present invention has for a further object to operate throttling of the air from the suction device by means of the air flowing from the milking vessel. With this object in view a small turbine or blade wheel is inserted in said ducts which wheel is continuously rotated by the air flowing from the milking vessels. Said wheel, the speed of which is adjustable, is conveniently secured at the milk collecting vessel and provided with a device, such as a segment, for instance, for cutting off the communication with the ducts of the milking devices, in such a manner that, during the rotation of said wheel, the various ducts from the milking vessels are successively closed more or less by means of said device. It has been proposed to produce such pulsations in the ducts from the milking vessels by providing a rotatable bar which is alternately tipped in either direction by the milk flowing from the milking vessels in such a manner that the milk receiving vessels provided at either side of said bar become connected with the ducts from the milking vessels. As the momentary interruptions within the ducts leading from the milking vessels to the suction device, depend upon the small angle of oscillation of the bar, and upon the momentary duration of the throwing over of said bar, strong pulsations, like that produced by the above blade wheel, cannot be got. Such strong pulsations are needful for causing the starting of the downward motions of the milking vessels, which motions produce the kneading action on the udder. Further drawbacks of the rotatable bar consist in that the ducts connecting the milk vessels to the suction device cannot be shut off successively and uniformly, and in that the momentary interception does not depend upon the uniform air sucking, but upon the continuously varying amount of sucked milk, and consequently said interceptions cannot be produced at regular intervals.

Figs. 5 and 6 show the improved device. At the milk collecting vessel $o$ is provided a box $p$ into which open two sucking ducts $q$, $q'$, from the milking vessels which ducts are inclined 120 degrees with respect to each other. Through an aperture $r$, at the lowermost point of the bottom of said box (which bottom may form the top of the milk collecting vessel) the milk may flow into said collecting vessel. The interior of the box $p$ communicates with the milk receptacle $o$ on which said box is mounted and to which is connected the main suction duct $s$. The suction duct $s$, shown in Fig. 5 is connected to a suitable suction device, not shown.

Within the box $p$ is located the somewhat heavy turbine or blade wheel $t$ provided with blades $u$ at about the two thirds of its periphery while the remaining portion of said periphery is provided with a segment $v$. The latter as well as the blades are close to the wall of the box $p$ without touching same. The air current from $q$ and $q'$ causes the wheel $t$ to rotate slowly, owing to its weight, and said air current is shut off when the segment $v$ is in front of the parts of the ducts $q$ and $q'$ so that the sucking action in said ducts is considerably lowered during this latter period. In order to secure the continuous rotary motion of the wheel $t$, an air inlet $w$ is provided.

Having now fully described my said invention, what I claim and desire to secure by Letters Patent, is:

1. A milking device comprising a central elastic tube formed with a duct, an outer tube spaced from the central tube, and having a vent opening, the outer tube being reduced at its lower end and embracing the lower end of the central tube, there being passages formed in the lower portion of the central tube to form communication between the central tube and the space between said two tubes, a cap slidably engaging the outer tube, said cap having a vent opening, and means for limiting the sliding movement between the outer tube and the cap, whereby when suction is applied to the lower end of the outer tube, the air will be withdrawn from said tubes and the outer tube will rise and admit air through the vents and exert pressure on the udder and cause the inner tube to collapse and exert pressure on the teat.

2. A milking device comprising an inner elastic tube to engage a teat, a nozzle at the lower end of the inner tube, said nozzle having air vents, an outer tube spaced from the inner tube and reduced at its lower end to engage the nozzle, the vent openings in the nozzle affording communication between the space formed between the inner and outer tubes and the reduced portion of said outer tube when the parts are in normal position, the outer tube having a vent opening, and a depending cap supported by the inner tube and formed with a vent opening, said cap being positioned to form a support on which the outer tube slides, whereby when suction is applied to the lower ends of the tubes air will be withdrawn from both tubes and cause the outer tube to rise and subsequently air will be admitted through the vent openings in the outer tube and the cap and cause the inner tube to collapse.

3. A milking device comprising an inner tube adapted to embrace a teat, a nozzle at the lower end of the inner tube, said nozzle having vents disposed some distance below the top of the nozzle, an outer tube spaced from the inner tube and having a vent opening, the lower end of the outer tube being reduced and fitting around the nozzle, the vent openings in the nozzle affording communication between the space formed between the inner and outer tubes and the reduced portion of said outer tube when the parts are in normal position, a cap member supported by the inner tube and slidably engaging the outer tube, said cap member having a vent opening, and means for limiting the movement of the outer tube, whereby when suction is applied to the reduced end of the outer tube, air will be simultaneously withdrawn from the tubes and the outer tube will rise and close the vents in the nozzle and the vent openings in the outer tube and the cap will register and admit a supply of air to the space between the tubes and thereby collapse the inner tube and return the outer tube to normal position.

4. A milking device comprising a central elastic tube having a nozzle at its lower end, said nozzle having a duct and vent openings, an outer tube surrounding and spaced from the inner tube and formed with a vent opening near its upper end, the lower end of the outer tube being reduced and fitting around the nozzle, the vent openings in the nozzle affording communication between the space formed between the inner and outer tubes and the reduced portion of said outer tube when the parts are in normal position, a cap having a vent opening to coöperate with the vent opening in the outer tube the outer tube being in sliding contact with the cap, a tube connected to the lower end of the outer tube, and a pulsator in the tube, whereby when suction is applied to the tubes, the air will be withdrawn, and cause the outer tube to rise and the vents in the nozzle to close and the vent openings in the cap and outer tube to register and admit air to the space between the two tubes and collapse the inner tube.

In testimony whereof I have hereunto set my hand in presence of two witnesses.

WILHELM LÜBKE.

Witnesses:
 ERNST KATZ,
 ERNST BLANCK.